United States Patent [19]
Somer

[11] Patent Number: 6,052,362
[45] Date of Patent: Apr. 18, 2000

[54] ETHERNET REPEATER DATA PATH LOOPBACK

[75] Inventor: Gregory B. Somer, Mountain View, Calif.

[73] Assignee: Cypress Semiconductor Corporation, San Jose, Calif.

[21] Appl. No.: 08/724,623

[22] Filed: Sep. 30, 1996

[51] Int. Cl.[7] .................................. H04J 1/16; H04J 3/14
[52] U.S. Cl. ............................................ 370/246; 370/249
[58] Field of Search .................................... 370/241, 242, 370/243, 245, 246, 249, 226, 274, 293, 315, 492, 501; 375/213, 214, 211; 371/20.2; 379/4

[56] References Cited

U.S. PATENT DOCUMENTS

| 5,465,250 | 11/1995 | Brief ........................................ 371/20.5 |
| 5,553,059 | 9/1996 | Emerson et al. ............................. 379/5 |
| 5,566,160 | 10/1996 | Lo ............................................ 370/401 |
| 5,577,023 | 11/1996 | Marum et al. .......................... 370/248 |
| 5,586,111 | 12/1996 | Wise ....................................... 370/241 |
| 5,737,316 | 4/1998 | Lee ........................................ 370/248 |
| 5,778,003 | 7/1998 | Pappa et al. ............................ 370/241 |
| 5,784,558 | 7/1998 | Emerson et al. ........................ 370/524 |
| 5,787,114 | 7/1998 | Ramamurthy et al. ................. 375/221 |
| 5,790,294 | 8/1998 | Horiuchi et al. ........................ 359/177 |

*Primary Examiner*—Ajit Patel
*Attorney, Agent, or Firm*—Blakely, Sokoloff, Taylor & Zafman LLP

[57] ABSTRACT

An apparatus and method for testing a communication device using a loopback path. A circuit is used to internally generate a test packet and to check the test packet once the test packet is transmitted through a loopback path within the communication device. The loopback path includes a data path from a test transceiver, through a first path within the core logic, at least one selected physical transceiver, a second path within the core logic and back to the test transceiver.

18 Claims, 10 Drawing Sheets

ETHERNET REPEATER DATA PATH LOOPBACK

FIELD OF THE INVENTION

The present invention pertains generally to the field of communication networks. More particularly, the present invention relates to the field of communication hubs.

BACKGROUND OF THE INVENTION

A communication hub typically connects multiple nodes in communication network such as a local area network (LAN). By connecting the nodes in the network to the communication hub via communications links (e.g. coaxial, twisted-pair, or fiber optic cable), the communication hub relays data packets from the various nodes along the appropriate data path in the communications network. This allows the various communication nodes to communicate with one another. However, the data packets received by the communication hub are usually deteriorated to an unacceptable level. This requires the communication hub to restore the signal quality of the data packets and to tack on any truncated portions of the data packets before transmitting the data packets to another node. Typically, the original signal quality and the truncated portion of the data packet are restored by regenerating the signal.

If the communication hub fails to restore the original signal quality to an acceptable level, to tack on any missing portions, or to transmit the data packets along the appropriate data path, the communication network may not function properly (i.e. transmit incorrect data packets). Although most communication hubs are presently tested during production to ensure that the communication hubs manufactured meets the required performance and quality specifications, it is desirable to test the communication hubs while operating in the field. For example, if there is a breakdown in a communication network system, it is desirable to test the communication hub in its normal working environment without removing the communication hub from the network.

In an Ethernet network, a typical Ethernet frame or packet includes a preamble, a header, data, and trailer components or sequences. When an Ethernet communication hub, such as an Ethernet repeater, receives a packet of data, a portion, if not the entire preamble sequence may be truncated. Typically, the preamble sequence precedes the data portion of the packet, and as the receiver is synchronizing the incoming signals, the preamble sequence is truncated. Therefore, the Ethernet communication hub usually regenerates the specified preamble sequence and combines the regenerated preamble sequence with the original header, data and trailer components before transmitting the data packet to the rest of the nodes in the network.

Figure 1:
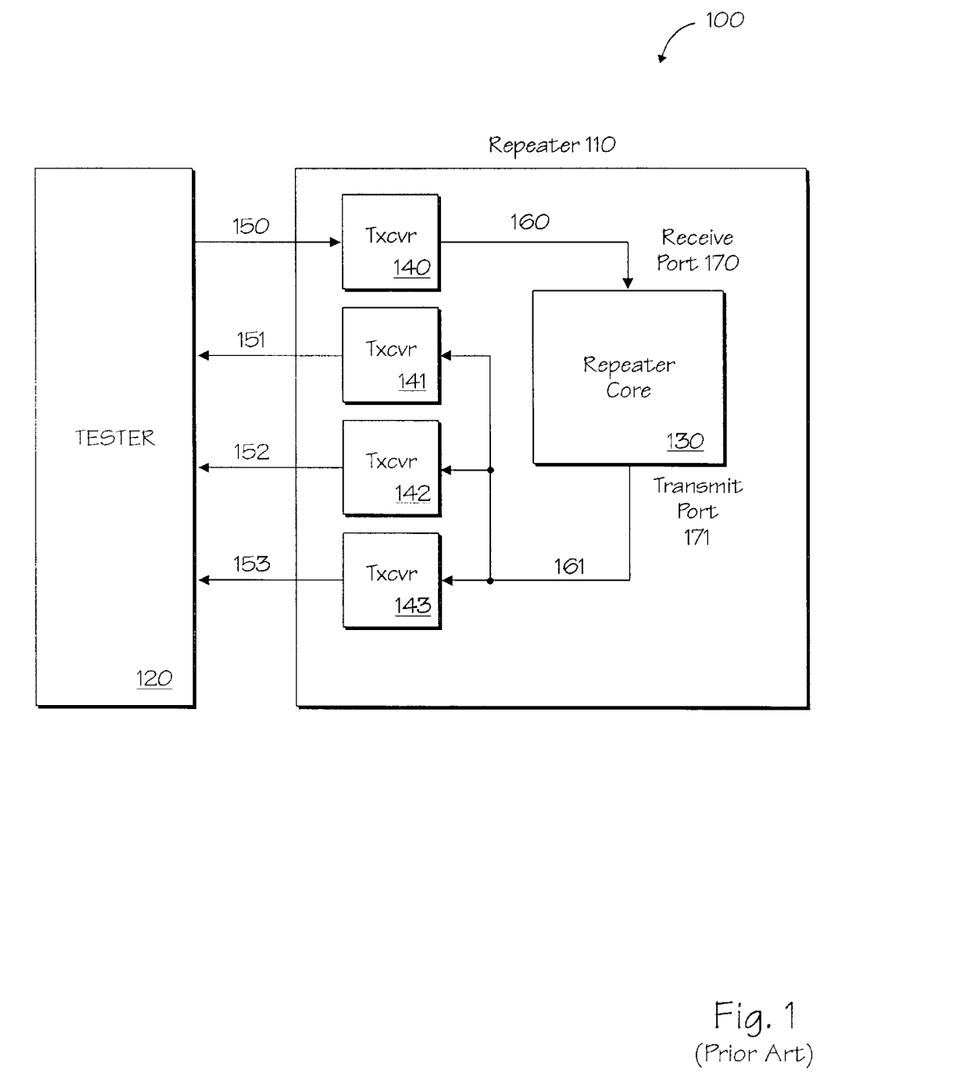
FIG. 1 illustrates a typical test set-up for an Ethernet repeater.

Presently, Ethernet repeaters are tested during manufacturing by connecting the Ethernet repeater to an external tester. The external tester may be a test system manufactured by Netcom located in Los Angeles, Calif., multiple personal computers or some other tester that is capable of individually stimulating each of the transceivers in the repeater. The Ethernet repeaters are usually tested by individually stimulating each of the transceiver ports and then checking the test packets that are transmitted by the other transceiver ports. A transceiver port is stimulated when it receives a test packet from the external tester. FIG. 1 illustrates a test set-up for testing an Ethernet repeater with an external test system. Typically, this set-up is used during the production testing of the Ethernet repeater or during the evaluation of the Ethernet repeater at some other test facility (i.e. a failure analysis laboratory). In other words, the Ethernet repeater may only be tested at locations which are suitable for this test set-up.

An Ethernet repeater typically includes multiple transceivers for interfacing with other communication nodes through a transmission medium (such as a twisted pair cable). The transceivers usually include circuitry for both the transmission and the reception of data packets. Furthermore, an Ethernet repeater typically includes core logic for coordinating the data traffic for the transceivers. One of the functions of the core logic is to detect a collision when two or more data packets simultaneously receive a data packet.

The tester 120 shown in FIG. 1, externally stimulates the transceiver 140 by sending test packets to the transceiver 140 over an external connector 150. The external connector 150 may be a cable. The test packets received by the repeater 110 flow through the transceiver 140 and over line 160 to the receive port 170 of the repeater core logic 130. From the receive port 170, the test packets flow through the repeater core logic 130 and out through the transmit port 171 of the repeater core logic 130 onto line 161. Line 161 is coupled to the transceivers 141, 142 and 143. From line 161, the test packets are transmitted by the transceivers 141, 142 and 143 to the tester 120 to be tested.

Therefore, according to FIG. 1, the receiving channel of the transceiver 140, the repeater core logic 130 and the transmitting channels of the transceivers 141, 142 and 143 are tested when the transceiver 140 is externally stimulated. Similarly, the receiving channels of the transceivers 141, 142 and 143 may be individually stimulated by the tester 120. By transmitting the test packets through a selected path within the Ethernet repeater, a selected portion of the Ethernet repeater is tested.

One of the drawbacks of testing the Ethernet repeater in the manner shown in FIG. 1 is that expensive testing equipment is typically required. Another drawback is that it is very difficult to implement this test set-up out in the field. For all practical purposes, this test set-up is typically limited to a production/manufacturing facility or a testing facility because of the physical connections required for this set-up. For example, in order to test all of the transceiver ports, the tester must be physically connected to the back of every transceiver port.

Therefore, it is desirable to provide an apparatus and method of testing Ethernet repeaters without the added costs associated with external test equipment. Furthermore, it is desirable to have the flexibility of testing the Ethernet repeater at various locations.

SUMMARY OF THE INVENTION

The present invention provides an apparatus and method for testing a communication repeater. The present invention concerns an apparatus having a circuit, a test transceiver, at least one physical transceiver and a core circuit. The circuit is configured to generate and check a test packet. The test transceiver is coupled to the circuit and is configured to operate in a duplex mode. The core circuit is coupled to the test transceiver and at least one physical transceiver. The test transceiver is configured to receive the test packet from the circuit and configured to transmit the test packet to the circuit. The core circuit is configured to direct the transmission of the test packet through at least one loopback path within the communication repeater.

The present invention concerns a method for testing a communication repeater. The communication repeater is configured to operate in a loopback mode. At least one transmitting channel and at least one receiving channel from at least one transceiver is selected to be tested. An internally generated test packet is transmitted through at least one loopback path.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth embodiments in accordance with the present invention for a data loopback path within an Ethernet repeater. In the following description, details are set forth such as specific circuitry configurations in order to provide a thorough understanding of the present invention. It will be evident, however, that the present invention may be practiced other than as explicitly described in these details. In other instances, the functioning of well-known circuit components, logic gates, etc., have not been described in particular detail so as not to obscure the present invention.

Figure 2:
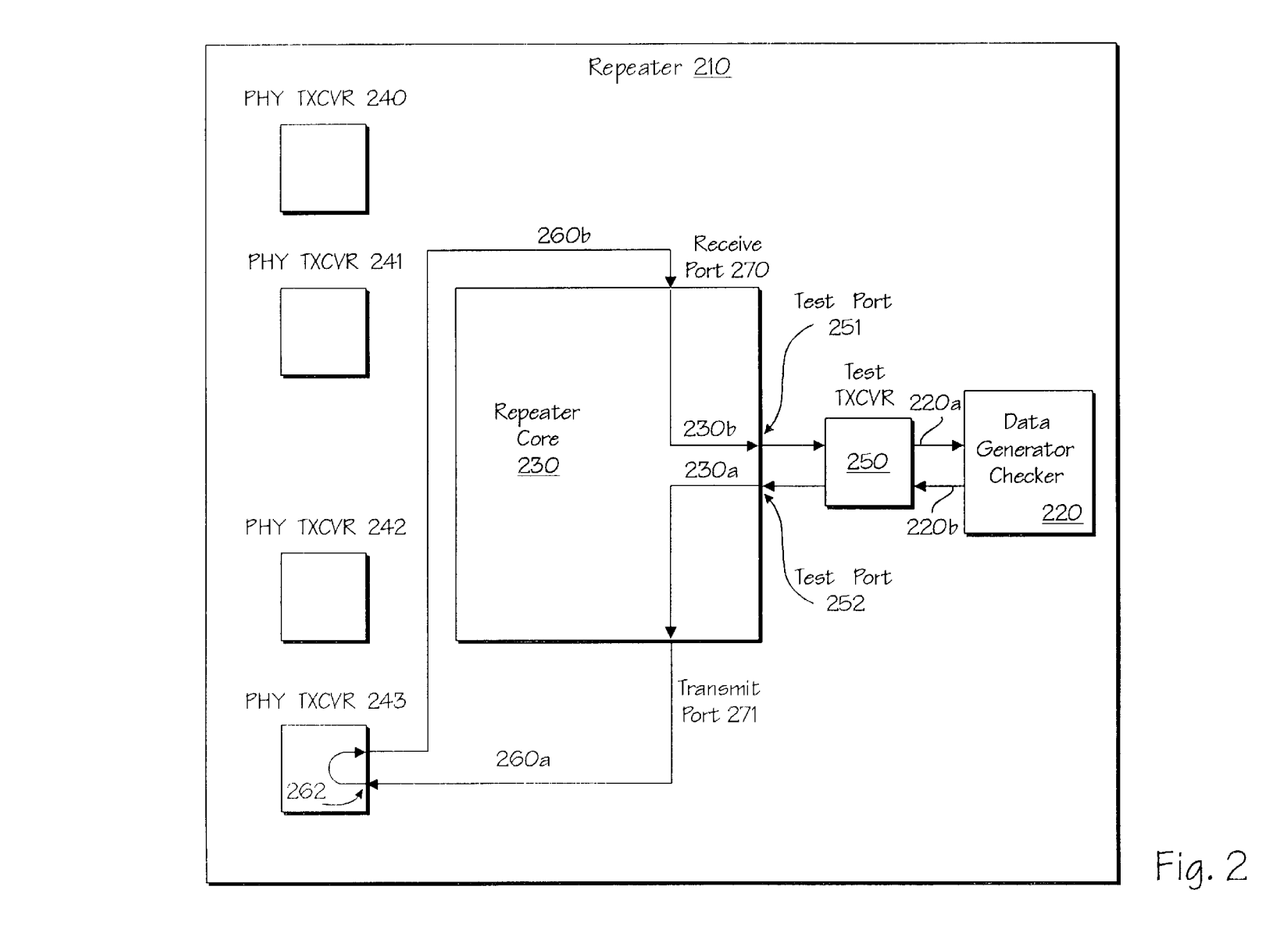
FIG. 2 illustrates one embodiment of the present invention having a single loop-back path within the Ethernet repeater.

During the testing of an Ethernet repeater, a specific data path within the Ethernet repeater is typically selected for testing. One embodiment tests the selected data path by transmitting test packets through a single loopback path within the Ethernet repeater. FIG. 2 illustrates a single loopback path within the Ethernet repeater 210 for one embodiment. According to FIG. 2, the repeater 210 includes the physical transceivers 240, 241, 242 and 243, the repeater core logic 230, the test transceiver 250 and the data generator and checker circuit 250. Although the embodiment shown in FIG. 1 has a dedicated test transceiver 250, the test transceiver 250 may operate as a physical transceiver during the normal operation of the repeater 210.

During the normal mode of operation of the repeater 210, the repeater core logic 230 monitors the data packets received or transmitted by the physical transceivers 240–243. If any of the physical transceivers 240–243 receives a data packet, the active transceiver (i.e., the transceiver receiving a data packet) sends a message to the repeater core logic 230. This message informs the repeater core logic 230 that a data packet is being received by one of its transceivers. Typically, when a data packet is received by a transceiver, the preamble sequence that precedes the data packet is truncated as the transceiver (receiver) synchronizes to the incoming signals. As such, the data packet received by the repeater core logic 230 does not include its original preamble sequence. Therefore, the repeater core logic 230 responds to the message sent by the active transceiver by regenerating the original preamble sequence. The portion of the data packet that has not been truncated is then temporarily stored inside the repeater core logic 230 while the repeater core logic 230 is regenerating the original preamble sequence. After the original preamble sequence has been regenerated by the repeater core logic 230, the repeater core logic 230 combines the regenerated preamble sequence with the portion of the data packet that has not been truncated to regenerate the original test packet. This regenerated test packet is then transmitted from the repeater 210 along the appropriate data path within the communication network.

Typically, during the normal mode of operation of the repeater 210, if more than one of the physical transceivers 240–243 start to receive a data packet simultaneously, then the repeater core logic 230 detects a collision. The repeater 210 responds to a collision detection by disregarding the data packets received by the active transceivers (i.e. the transceiver receiving data packets). Furthermore, the repeater core logic 230 generates a jam pattern which is sent to the physical transceivers 240–243 which prevents erroneous data from being transmitted. Thus, an error is detected if more than one physical transceiver receives a data packet during the normal mode of operation of the repeater 210.

The embodiment shown in FIG. 2, however, has the capability of decoupling or disabling the collision logic between the test port and the other ports under test. During testing when the loopback mode of operation of the repeater is selected, the test port and one of the transceivers under test may simultaneously receive a data packet without causing a collision error to be detected by the core logic 230. This allows the repeater 210 to test a data path within the repeater 210 by transmitting the test data through a loopback test path within the repeater 210 even though the test port and the transceiver under test simultaneously receive data.

FIG. 2 illustrates a loopback test path for one embodiment. During the test mode of operation, the collision circuitry between the test port and the other ports is disabled such that the test transceiver 250 and the physical transceiver 243 are capable of receiving test packets simultaneously. For an alternative embodiment, a test transceiver 250 may not be present and the test ports 251 and 252 may be directly connected to the data generator and checker circuit 220. During testing, the data generator and checker circuit 220 generates the test packets which are transmitted to the test transceiver 250 via line 220b. The data packets generated by the data generator and checker circuit 220 are referred to as test packets. The test transceiver 250 then transmits the test packets to the test port 252 of the repeater core logic 230. Within the repeater core logic 230, the test packets are transmitted over an input test path 230a to the transmit port 271 of the repeater core logic 230. From the transmit port 271, the test packets are transmitted over line 260a to the physical transceiver 243.

For one embodiment, the physical transceiver 243 is operating in the loopback mode such that the test packets are transmitted from the transmitting channel of the physical transceiver 243 to the receiving channel of the physical transceiver 243. This type of loopback mode is referred to as a transceiver loopback mode. Typically, when a transceiver is operating in its loopback mode, its transmitting port receives the test packets from the repeater core logic 230 and its receiving port transmits the test packets to the repeater core logic 230. The path 262 represents the loopback path of the physical transceiver 243. On the other hand, when a transceiver is operating in its normal mode, its receiving port receives the data packets from an external source and its transmitting port transmits the data packets to an external destination.

Figure 4:
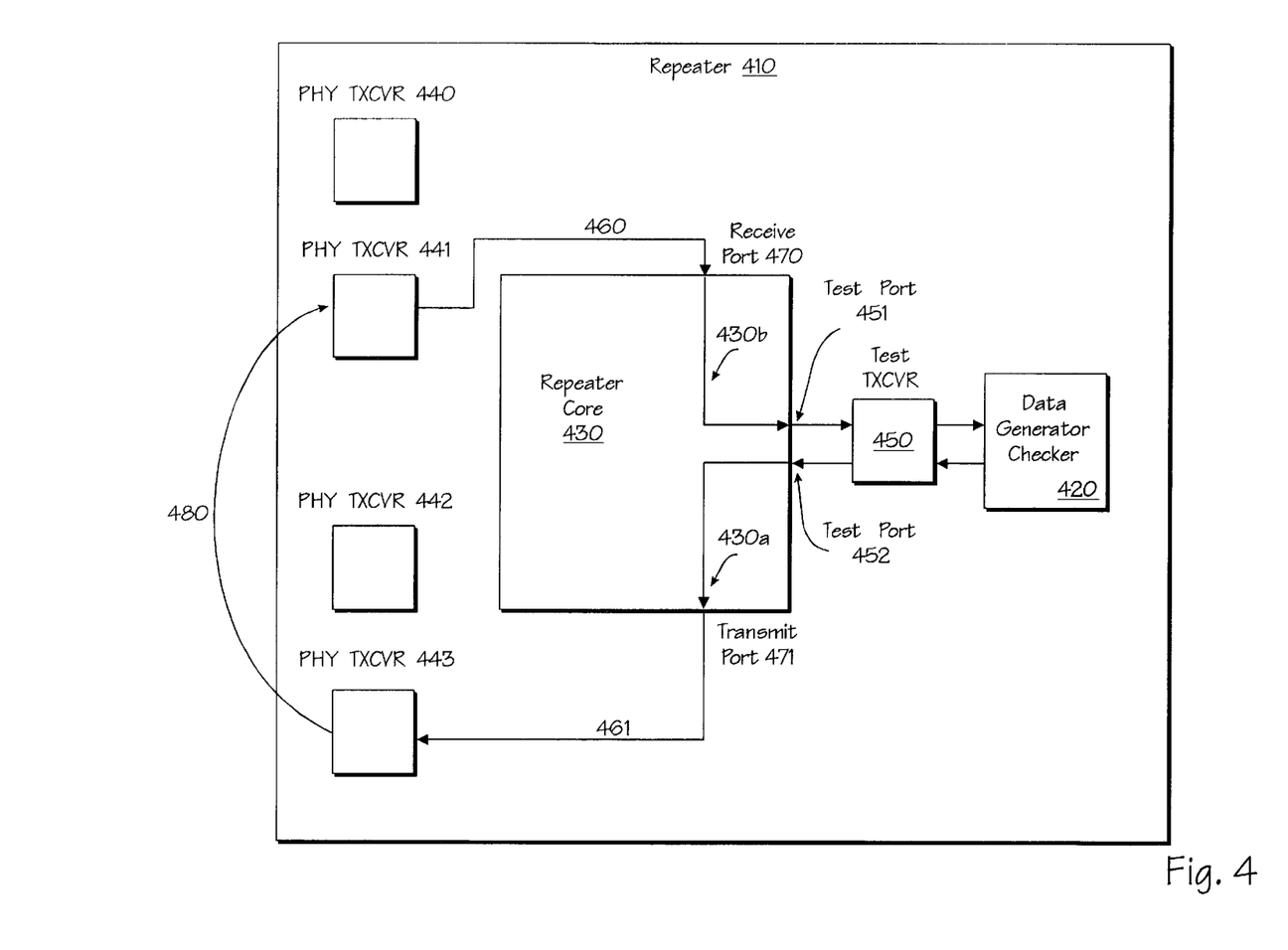
FIG. 4 illustrates an alternative embodiment of the present invention having a single loop-back path within the Ethernet repeater.

The embodiment shown in FIG. 2 has both the repeater 210 operating in its loopback mode and the selected physical transceiver 243 operating in its loopback mode. For an alternative embodiment, a single loopback test path is implemented by having the repeater operate in the loopback mode while the selected physical transceivers are operating in their normal mode as shown in FIG. 4.

The physical transceiver 243 then transmits the test packets over line 260*b* to the receive port 270 of the repeater core logic 230. From the receive port 270, the test packets are transmitted over the output test path 230*b* to the test port 251 of the repeater core logic 230. From the test port 251, the test packets are transmitted back to the test transceiver 250. The test transceiver 250 then transmits the test packets back to the data generator and checker circuit 220 over line 220*a* to be tested.

In short, the repeater loopback test path for one embodiment includes the data path through the receiving channel of the test transceiver 250, the input test path 230*a* of the repeater core logic 230, the loopback path of the physical transceiver 243, through the output test path 230*b* of the repeater core logic 230, and the transmitting channel of the test transceiver 250. In other words, the loopback path shown in FIG. 2 tests the data path through the transmitting and receiving channels of the physical transceiver 243 and the repeater core logic. The physical transceivers 240, 241 and 242 may be tested in a similar fashion. Because the collision circuit between the test port and the other ports is disabled during testing for the embodiment shown in FIG. 2, the dedicated test transceiver 250 and the physical transceiver 243 are capable of simultaneously receiving test packets without triggering a collision error. This particular test set-up allows the repeater 210 to use internally generated test packets to test the various channels within the repeater 210.

For one embodiment, the data generator and checker circuit 220 may include an Ethernet media access controller ("MAC") and a microprocessor running a test program. Currently available MACs, such as those manufactured by Digital Equipment Corporation, Advanced Micro Devices, and Intel, generate the proper Ethernet test packets while adhering to the Ethernet protocols. Typically, an Ethernet MAC device may be configured to run in a full duplex mode of operation during testing. The software controlling the Ethernet MAC device may be responsible for creating the test packets and checking the incoming data against the outgoing data. During the normal mode of operation, the Ethernet MAC device may be used for management purposes or as part of the bridge port.

Therefore, the selected data paths within the repeater 210 may be tested by transmitting the test packets generated by the data generator and checker circuit 220. For one embodiment, the data generator and checker circuit 220 is located within the repeater 210 and for an alternative embodiment, the data generator and checker circuit 220 is externally coupled to the repeater 210 and located within the same system. Thus, the repeater 210 may be tested without connecting its transceivers to an external tester. By eliminating the physical connections required by an external tester, the present repeater 210 may be conveniently tested in the field.

Figure 3:
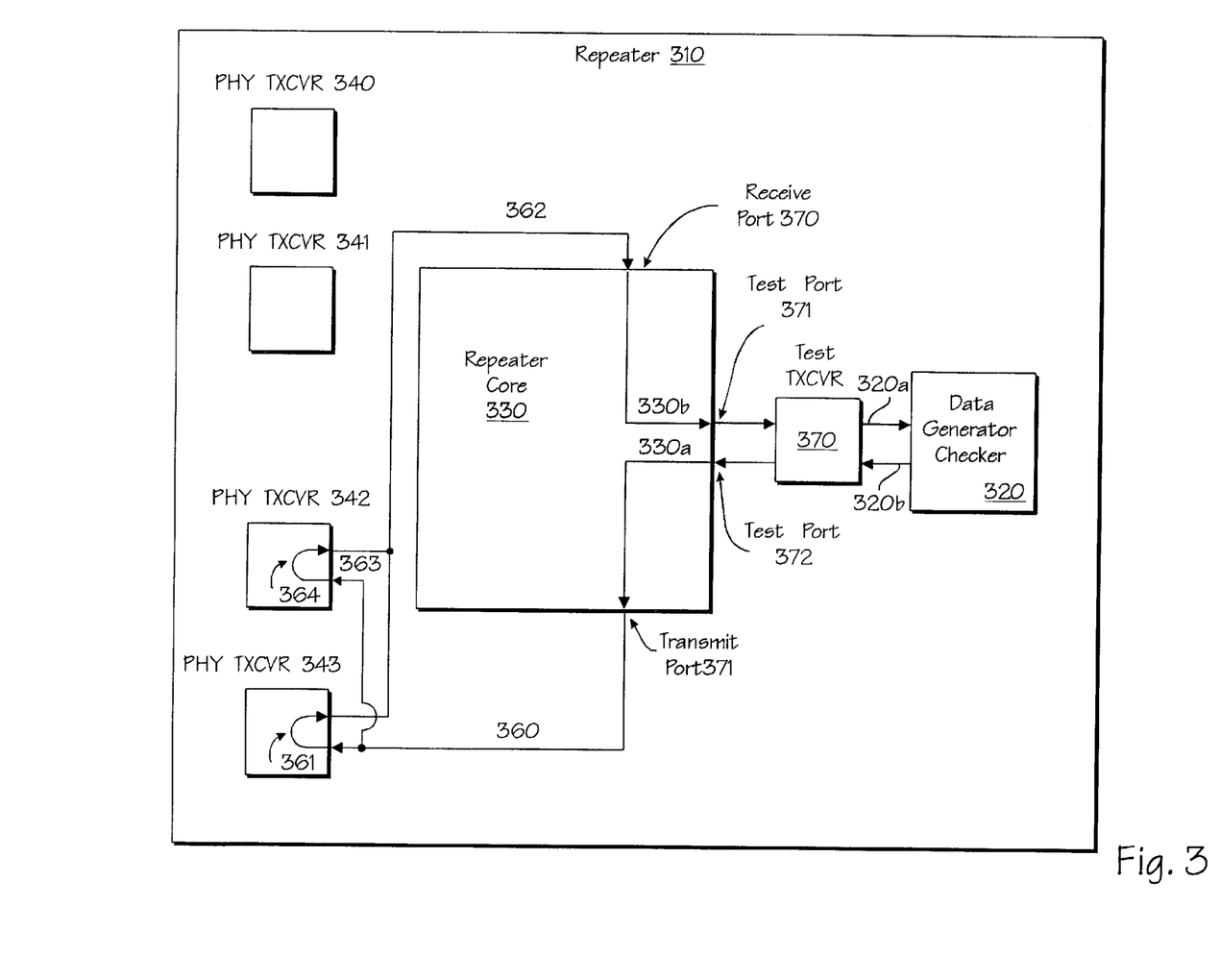
FIG. 3 illustrates one embodiment of the present invention having two loop-back paths within the Ethernet repeater.

FIG. 3 illustrates one embodiment of the present invention having two loopback test paths within the Ethernet repeater 310. According to FIG. 3, the Ethernet repeater 310 includes a data generator and checker circuit 320, a test transceiver 370, a repeater core logic 330, and the physical transceivers 340, 341, 342, and 343. The embodiment shown in FIG. 3 is typically used to test the collision logic within the repeater core circuit 330. When a collision circuit is functioning properly, it will generate the correct jam pattern when two or more of the physical transceivers simultaneously receive test packets. Although the test transceiver 370 is also receiving the test packet, the activity at the receiving port of the test transceiver 370 data does not trigger the collision circuit.

According to FIG. 3, the test packets generated by the data generator and checker circuit 320 are transmitted over line 320*a* to the test transceiver 370. The test transceiver 370 then transmits the test packets to the test port 372 of the repeater core logic 330. Within the repeater core logic 330, the test packets are transmitted over the input test path 330*a* to the transmit port 371. From the transmit port 371 of the repeater core logic 330, the test packets are then transmitted over line 360 to the transmitters in both the physical transceivers 342 and 343.

According to FIG. 3, the physical transceivers 342 and 343 are operating in the loopback mode. Therefore, the test packets received by the transceiver 343 are transmitted to the receiver of the physical transceiver 343, and the test packets received by the transmitter of the physical transceiver 342 are transmitted to the receiver of the physical transceiver 342. The data paths 361 and 364 represent the loopback paths within the physical transceiver 343 and 342, respectively. The receivers in the physical transceivers 342 and 343 then indicate to the repeater core logic 330 that each of the receivers are receiving a packet. This causes contention for port 370 and is recognized as a collision.

For one embodiment, the output test path includes the collision circuit. If the collision circuit is functioning properly, the repeater core logic 330 generates a jam pattern. The test transceiver 370 then transmits the jam pattern over line 320*b* to the data generator and checker circuit 320. Therefore, by transmitting the test package generated by the data generator and checker circuit 320 through two loopback paths within the repeater 310, the collision circuit within the repeater core 330 may be tested. Although FIG. 3 shows that the data generator and checker circuit 320 is located within the repeater 310, an alternative embodiment may have the data generator and checker circuit 320 located within the same system but not within the repeater 310. In this situation, the data generator and checker circuit 320 is coupled to the repeater 310 via an external connector. Note that if the generator and checker circuit 320 is located within the repeater, the test transceiver 370 is not required.

FIG. 4 illustrates an alternative embodiment having a single loopback path within the Ethernet repeater 410. The repeater 410 includes the physical transceivers 440–443, the repeater core logic 430, the test transceiver 450 and the data generator and checker circuit 420. The loopback path within the repeater 410 is similar to the loopback path shown in FIG. 3 with the exception that the physical transceiver 443 is not operating in the transceiver loopback mode. Therefore, the physical transceiver receiving the test packets from the repeater core logic transmits the test packets to a different physical transceiver. Although the physical transceiver 443 transmits the test packets to the physical transceiver 441 in FIG. 4, for an alternative embodiment the physical transceiver 443 may transmit the test packets to the physical transceiver 440 or 442.

According to FIG. 4, the data generator in checker circuit 420 generates the test packets. Although the data generator and checker circuit 420 shown in FIG. 4 is located within the repeater 410, for an alternative embodiment, the data generator and checker circuit 420 may not be located within the repeater 410. Typically, a data generator and checker circuit 420 that is not located within the repeater 410 is coupled to the repeater 410 via an external connector.

The data generator and checker circuit 420 transmits the test packets to the test transceiver 450. The test transceiver 450 then transmits the test packets to the test port 452 of the repeater core logic 430. Within the repeater core logic 430, the test packets are then transmitted over the input test path 430a to the transmit port 471 of the repeater core logic 430. From the transmit port 471, the test packets flow through the transmitting channel of the physical transceiver 443, over an external connector 480, to the receiving channel of the physical transceiver 441. From the receiving channel of the physical transceiver 441, the test packets are then transmitted over line 460 to the receive port 470 of the repeater core logic 430.

Within the repeater core logic 430, the test packets are then transmitted over the output test path 430b to the test port 451 of the repeater core logic 430. From the test port 451, the test packets are transmitted to the test transceiver 450. The test transceiver 450 then transmits test packet to the data generator and checker circuit 420 to be tested.

The loopback path illustrated in FIG. 4 tests the data path through the transmitting channel of the physical transceiver 443, the receiving channel of the physical transceiver 441 and the repeater core logic 430. Although FIG. 4 illustrates a single test path, more than one test path may be tested at a time. For example, more than one transmitter within a physical transceiver may receive the test packets from the repeater core logic and more than one receiver may transmit the test packets back to the repeater core logic. Typically, in this situation, the collision circuit within the repeater core logic 430 is tested.

During testing, the transmitting channel of the physical transceiver 443 and the receiving channel of the physical transceiver 441 are internally stimulated by the test packets generated by the data generator and checker circuit 420. The external connector 480 must physically connect the transmitting channel selected to be tested to the receiving channel selected to be tested. For example, the transmitting channel of the physical transceiver 443 may be connected to the receiving channel of the physical transceiver 442 or to the receiving channel of the physical transceiver 440. Therefore, the various data paths within the repeater 410 may be selected for testing.

By externally connecting the selected transmitting channel to the selected receiving channel, rather than testing the transmitting and receiving channel within the same transceiver (i.e., when a physical transceiver is operating in a loopback mode), a higher percentage of the internal logic within the selected transceivers is typically tested. For example, by using an external connector, approximately 95% of the logic within the selected transceivers is tested, whereas a selected transceiver operating in the loopback mode may test only 90% of the logic. Furthermore, during the normal operation of the repeater 410, the data packets are typically not transmitted from the transmitting channel to the receiving channel within the same transceiver. Typically, under normal operating conditions, one transceiver receives a data packet while another transceiver transmits the data packet.

Figure 6:
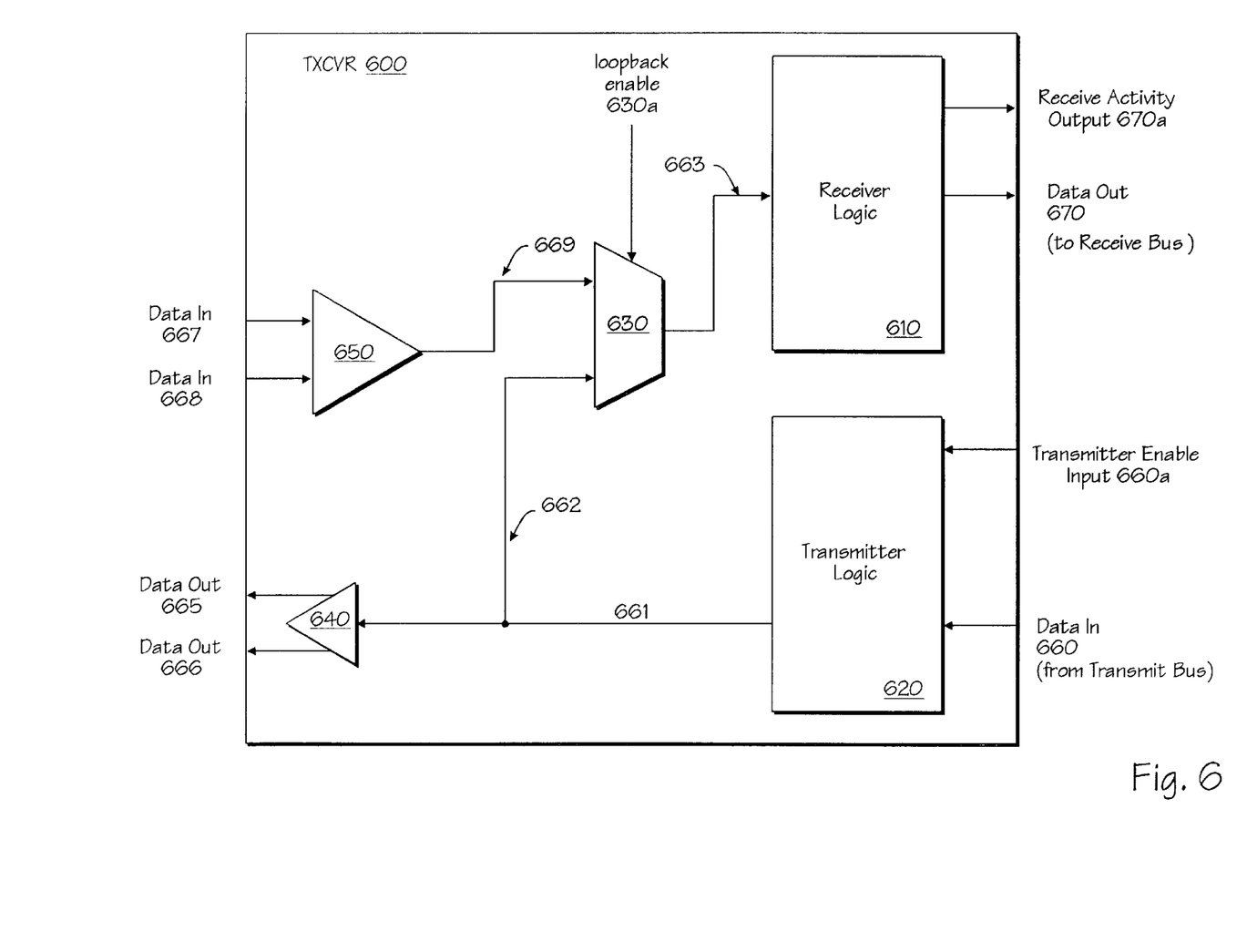
FIG. 6 illustrates one embodiment of the present physical transceiver.

FIG. 6 illustrates one embodiment of a physical transceiver. The physical transceiver 600 is a device that interfaces the repeater to a transmission medium such as twisted pair cable. Typically, the transmission medium is coupled to a computer. The transceiver 600 typically includes circuitry for both the transmission and the reception of the data packets.

According to FIG. 6, the transceiver 600 receives the data packets through the data input ports 667 and 668 and the transceiver 600 transmits the data packets through the data outputs 665 and 666 during its normal mode of operation. More specifically, the input buffer 650 receives the data packets via the data input ports 667 and 668 and then transmits the data packets over line 669 to the multiplexer 630. The loopback enable input 630a of the multiplexer 630 determines whether the multiplexer selects the data packets on line 669 or the test packets on line 662. During the normal mode of operation, the multiplexer 630 selects the data on line 669 and transmits the data packet on line 669 to the receiver logic 610 over line 663. The receiver logic 610 then outputs the data packet via data the output port 670 which is coupled to a receive bus. The receive activity output port 670a is also coupled to the receiver logic 610. The receive activity output port 670a provides a signal to indicate when a packet is being received by the transceiver 600. The receiving channel of the transceiver 600 includes the input buffer 650, the multiplexer 630 and the receiver logic 610. The transmitting channel of the transceiver 600 includes the output buffer 640, and the transmitter logic 620.

During the normal mode of operation of the repeater, the data packets are transmitted from the data input port 660 to the data output ports 665 and 666. More specifically, the transmitter logic 620 receives the data packet from the data input port 660 and then transmits the data packet over line 661 to the output buffer 640. The transmitter enable input 660a receives a signal to indicate when the data input port 660 should transmit the data packets to the transmitter logic 620. The output buffer 640 is coupled to the output of the transceiver 600 via the data outputs 665 and 666, respectively.

On the other hand, during testing, when the transceiver 600 is operating in the loopback mode, the transceiver 600 receives the test packet at the data input port 660 and outputs the test packet at the data output port 670. The transmitter logic 620 receives the test packets from the data input port 660 and transmits the data packet through the multiplexer 630 via lines 661 and 662. During testing, the multiplexer 630 selects the test packets on line 662 and transmits the test packets over line 663 to the receiver logic 610. The receiver logic 610 then transmits the test packets to the receive bus via the data output port 670. Typically, the loopback enable input 630a is controlled by the testing software.

Figure 5:
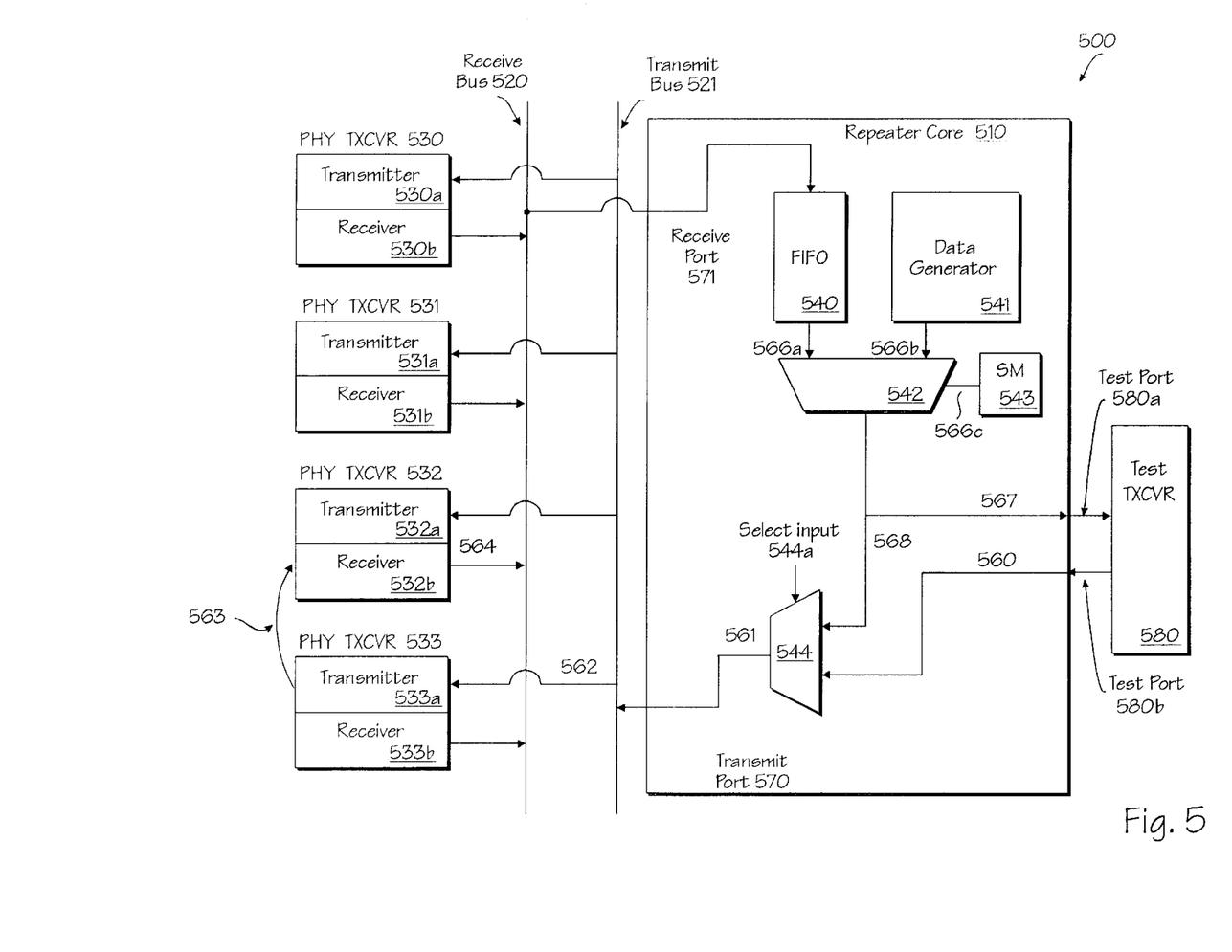
FIG. 5 illustrates one embodiment of the present Ethernet repeater.

FIG. 5 illustrates a detailed schematic of one embodiment of the present Ethernet repeater 500. The repeater 500 includes the physical transceivers 530–533, the receiver bus 520, the transmit bus 521, the repeater core logic 510 and the test transceiver 580. Although the repeater 500 shown in FIG. 5 does not include a data generator and checker circuit, an alternative embodiment may include the data generator and checker circuit within the repeater 500. The implementation show in FIG. 5 connects all the transceivers to the same receive bus 520 and the same transmit bus 521. For an alternative embodiment, all the physical transceivers 530–533 may not share the same receive bus 520 and/or the same transmits bus 521. However, the repeater design is simplified when the physical transceivers 530–533 share the same receive bus 520 and the same transmit bus 521.

During testing, a test packet is transmitted to the test port 580b of the repeater core logic 510. Within the repeater core logic 510, the test packet is transmitted over the input test path 560, which includes line 560, the multiplexer 544, and the line 561. During testing, the select input 544a of the multiplexer 544 selects the data on line 560. For an embodiment, the select input 544a is coupled to an external pin (or pad) that is used to select the normal mode or test mode of the repeater. Therefore, for one embodiment, when the external pin is asserted, the select input 544a selects the test input path. For an alternative embodiment, the test software may control the select input 544a. The multiplexer 544 then transmits the test packet to the transmit port 570 of the repeater core logic 510 over line 561.

The repeater core logic 510 then enables the transmitter on the selected transceiver (i.e., the transceiver selected to be tested). In the event that the collision logic is selected for testing, more than one transceiver is enabled by the repeater core logic 510. Each of the physical transceivers 530–533 have a dedicated transmitter enable line which is controlled by the repeater core logic 510. When a dedicated transmitter enable line for one or more of the physical transceivers 530–533 is activated, the transmit bus transmits data to the corresponding transmitter(s). For one embodiment, the software controls whether a dedicated transmitter enable line is enabled or disabled. Typically if the collision logic is selected for testing, then more than one transmitter is selected.

According to FIG. 5, the transmitter 533a in the physical transceiver 533 is selected for testing. Therefore, the repeater core logic 510 activates the dedicated transmitter enable line for the transmitter 533a. The transmit bus 521 then transmits the test packet to the transmitter 533a. The transmitter 533a is connected to the receiver 532b in the physical transceiver 532 via an external connector 563. Once the receiver 532b receives the test packet, the receiver 532b transmits the test packet onto the receive bus 520 via line 564.

From the receive bus 520, the test packets are transmitted to the receive port 571 of the repeater core logic 510. Within the repeater core logic 510, the test packets are transmitted over the output test path to the test port 580a. More specifically, the repeater core logic 520 temporarily stores the test packet received by the repeater core logic 510 in a buffer. For one embodiment, the buffer is a first-in-first out (FIFO) memory device 540. As the receiver 532b receives a test packet, the preamble sequence which is used to synchronize the test packet signals is typically truncated. Therefore, the repeater core logic 510 typically receives test packets having a truncated preamble sequence. In order for the repeater core logic 510 to regenerate the test packet, a specified preamble sequence is regenerated by the repeater core logic 510. The portion of the test packet that has not been truncated is temporarily stored in the FIFO memory device 540 while the data generator circuit 541 regenerates the original preamble sequence. Once the original preamble sequence has been regenerated, the portion of the test packet stored in the FIFO memory device 540 is combined with the regenerated preamble sequence to regenerate the original test packet. Note that the data generator circuit 41 includes a conglomerate of circuits for generating various other patterns such as the jam pattern.

The multiplexer 542, receives the portion of the test packet that has not been truncated from the FIFO memory device 540 over line 566a and the specified preamble sequence from the data generator 541 over line 566b. The select input 566c of the multiplexer 542 is controlled by the state machine 543. The state machine ensures that the regenerated preamble sequence and the data stored in the FIFO memory device 540 is properly combined to regenerate the original test packet. The regenerated test packet is transmitted over line 567 to the test port 580a of the repeater core logic 510. The test packet is then transmitted back to the test transceiver 580. Note that the test transceiver 580 is coupled to its own receive bus and transmit bus (not shown).

Figure 7:
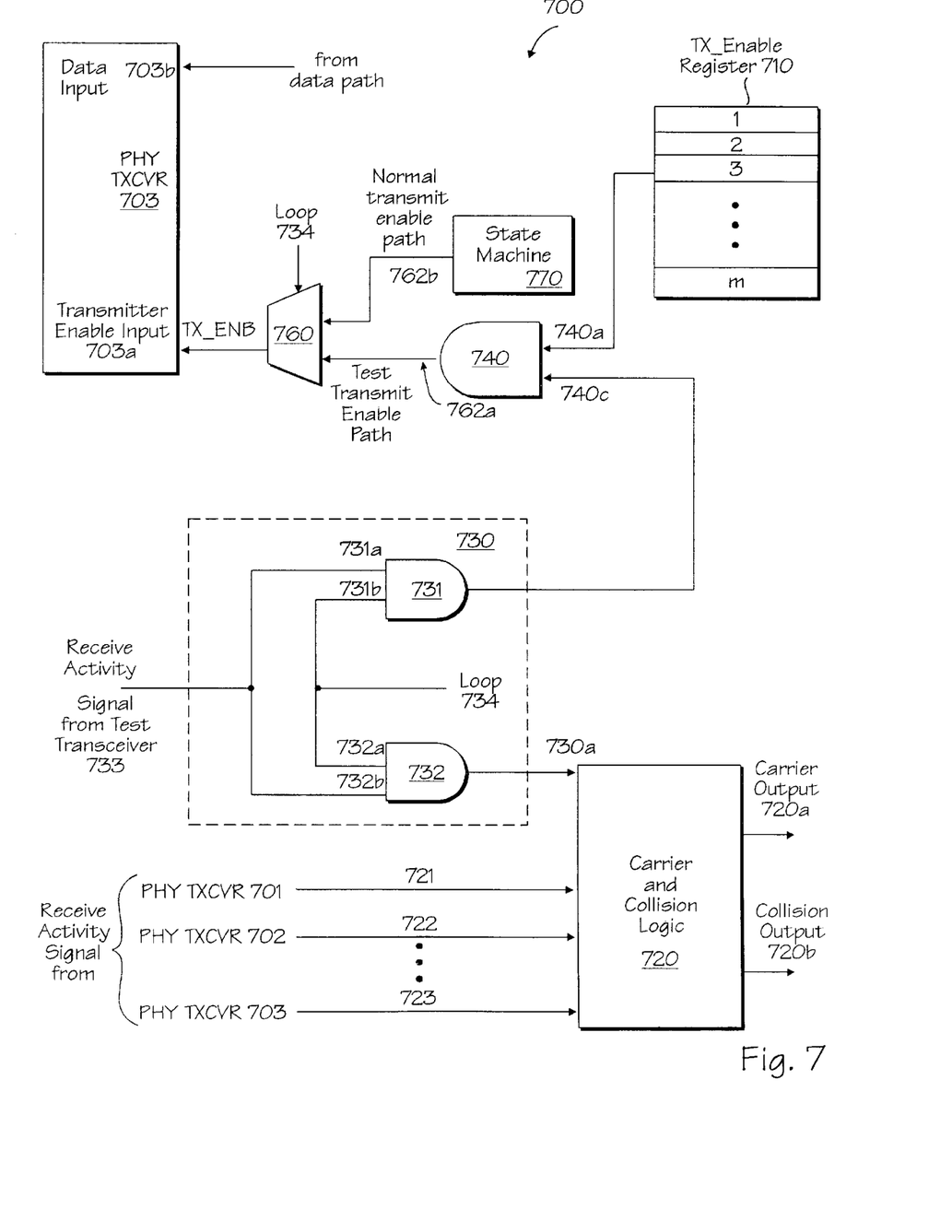
FIG. 7 illustrates one embodiment of a portion of the core logic circuitry.

FIG. 7 illustrates a portion of the repeater core logic for an embodiment of the present invention. More specifically, the repeater circuit 700 illustrates the circuitry involved in the coupling and decoupling of the collision logic and the selecting and deselecting of the dedicated transmitter enable lines.

During the normal operation of the repeater, the carrier and collision logic 720 is enabled and responsive to the receive activity of the physical transceivers 701, 702, and 703. The physical transceivers 701–703 are coupled to the carrier and collision logic 720. The receive activity signals from the physical transceivers 701–703 are provided via lines 721–723, respectively. If one or more of the physical transceivers 701–703 start to receive a data packet simultaneously during the normal mode of operation, then the carrier and collision logic 720 detects a collision. The carrier and collision logic 720 then outputs a signal at the collision output 720b to indicate a collision has been detected. If only a single transceiver receives a packet, then the carrier signal goes active to indicate that no collision has been detected. When this occurs, the carrier and collision logic 720 outputs a signal at the carrier output 720a. This signal informs the repeater core logic that one of the transceivers is receiving a data packet.

Once a collision is detected by the carrier and collision logic 720, the repeater disregards the data received by any of the transceivers 701–703 and generates a jam pattern. The jam pattern is sent by the repeater core logic to all the physical transceivers. Typically, the jam pattern is generated by a data generator such as the data generator 541 shown in FIG. 5. In the event that only one of the physical transceivers receives a data packet during the normal mode of operation, the data packet is then directed through the normal data path within the repeater.

The test transceiver is coupled to the carrier and collision logic 720 via circuit 730. Therefore, the circuit 730 receives a receive activity signal 733 from the test transceiver. The receive activity signal 733 indicates that a test packet is being transmitted from the data generator and checker circuit to the repeater core logic. Note that the receive activity signal 733 is the signal provided by the receive activity output 670a of the test transceiver 600. In response to the receive activity signal 733, the circuit 730 enables or disables the test port of the carrier and collision logic 720 via line 730a. Note that when the test transceiver is decoupled from the carrier and collision logic 720, the physical transceivers may still cause the carrier and collision logic to detect a collision.

The circuit 730 is responsible for enabling or disabling the carrier and collision logic 720 for the test port. During the normal mode of operation, the test port behaves like a normal port and the carrier and collision logic 720 receives a receive activity signal for the test port from the circuit 730 via line 730*a*, and during the testing mode of operation, the carrier and collision logic 720 is decoupled from the circuit 730 because the line 730*a* is forced inactive. The circuit 730 includes the AND gates 731 and 732. The first input 731*a* of the AND gate 731 and the first input 732*b* of the AND gate 732 are capable of receiving the receive activity signal 733 from the test port. The receive activity signal 733 from the test transceiver indicates when the test transceiver transmits a test packet to the repeater core logic. The AND gates 731 and 732 are used to "steer" this signal 733 to either the carrier and collision logic 720 when the normal mode of operation is selected or to the transmitter enable input 703*a* when the loopback mode of operation of the repeater is selected. The second input 731*b* of the AND gate 731 and the second input 732*a* of the AND gate 732 are capable of receiving the loop signal 734. The loop signal 734 indicates whether the loopback or normal mode of the repeater has been selected. For one embodiment, the loop signal 734 is generated by asserting a select pin (or input) of the repeater. For an alternative embodiment, the loop signal 734 is controlled by the test software.

The following example illustrates how the circuit 730 is coupled to the carrier and collision circuit 770 during the normal mode of operation or during the testing mode of operation when testing the collision logic. During the normal mode of operation of the repeater, the loop signal 734 is deasserted (i.e., a logic "0"). In this scenario, the AND gate 731 generates a logic low output signal and the AND gate 732 follows the logic level of the receive activity signal for the test port which is now a normal port. In other words, the test transceiver is capable of operating as a physical transceiver during the normal mode of operation. Therefore, the carrier and collision logic 720 is capable of detecting a collision during the normal mode of operation between any port in the repeater including the test port which is now a normal port.

During the test mode of operation, the test port input 730*a* of the carrier and collision logic 720 is typically disabled. The circuit 730 is responsible for steering the receive activity signal from the carrier and collision logic 720 toward the circuit 740. When a test packet is generated, the circuit 730 generates a logic high output signal that enables the AND gate 740 (also referred to as the transmitter enable circuit) when the other input signal into the AND gate 740 also receive a logic high signal. The input 740*a* of the AND gate 740 is coupled to the transmitter enable register 710. According to FIG. 7, the transmitter enabled register 710 includes M memory locations, each of the M memory locations corresponds to one of the physical transceivers. For example, the memory location 3 of the transmitter enable register 710 is used to enable the transmitter in the physical transceiver 703. For an alternative embodiment, external input pins may be used to select the individual physical transceiver to be tested.

Therefore, when the memory location 3 in the transmitter enable register 710 provides a logic high signal to the input 740*a* and the circuit 730 provides a logic high signal to the input 740*c*, then the AND gate 740 generates a logic high output signal. The output signal of the AND gate 740 provides one of two inputs into the multiplexer 760. Note that the circuit including the multiplexer 760 and the AND gate 740 is replicated for each physical transceiver port.

The loop signal 734 which is coupled to the select input of the multiplexer 760 is used to select either the test transmit enable path 762*a* or the normal transmit enable path 762*b*. The test transmit enable path 762*a* is coupled to the output of the AND gate 740. The normal transmit enable path 762*b* is coupled to the state machine 770. The state machine 770 provides the transmit control for the normal transmit enable path 762*b*. Note that the state machine 770 also controls the data path. In response to the loop signal 734, the multiplexer 760 outputs a transmitter enable signal which is received by the transmitter enable input 703*a*. For the embodiment shown in FIG. 7, the transmitter enable signal TX_EN3, corresponding to the memory location 3 in the transmitter enable register 710, is generated by the multiplexer 760. Therefore, the AND gate 740, the multiplexer 760, the state machine 770, the circuit 730, and the transceiver enable register 710 provide the control path for the physical transceiver 703. The embodiment shown in FIG. 7 illustrates how the physical transceiver 703 is enabled to receive data. The physical transceivers 701 and 702 in the repeater may be enabled to receive data in a similar manner.

Note that there are two paths that need to be altered in the loopback mode: the control path and the data path. The control path has been described in conjunction with FIG. 7. The data path, however, has been described in conjunction with FIG. 5 and includes the FIFO 540, the data generator 541, the multiplexer 542, the state machine 543 (which corresponds to the state machine 770), and the multiplexer 544. Note that the multiplexer 544 receives the loop signal 734 at its select input 544*a*. Thus, the control path generates the transmit enable signal which is received by the transmitter enable input 703*a* of the physical transceiver 703. Furthermore, the data path generates the data received at the data input 703*b* of the physical transceiver 703.

Figure 8:
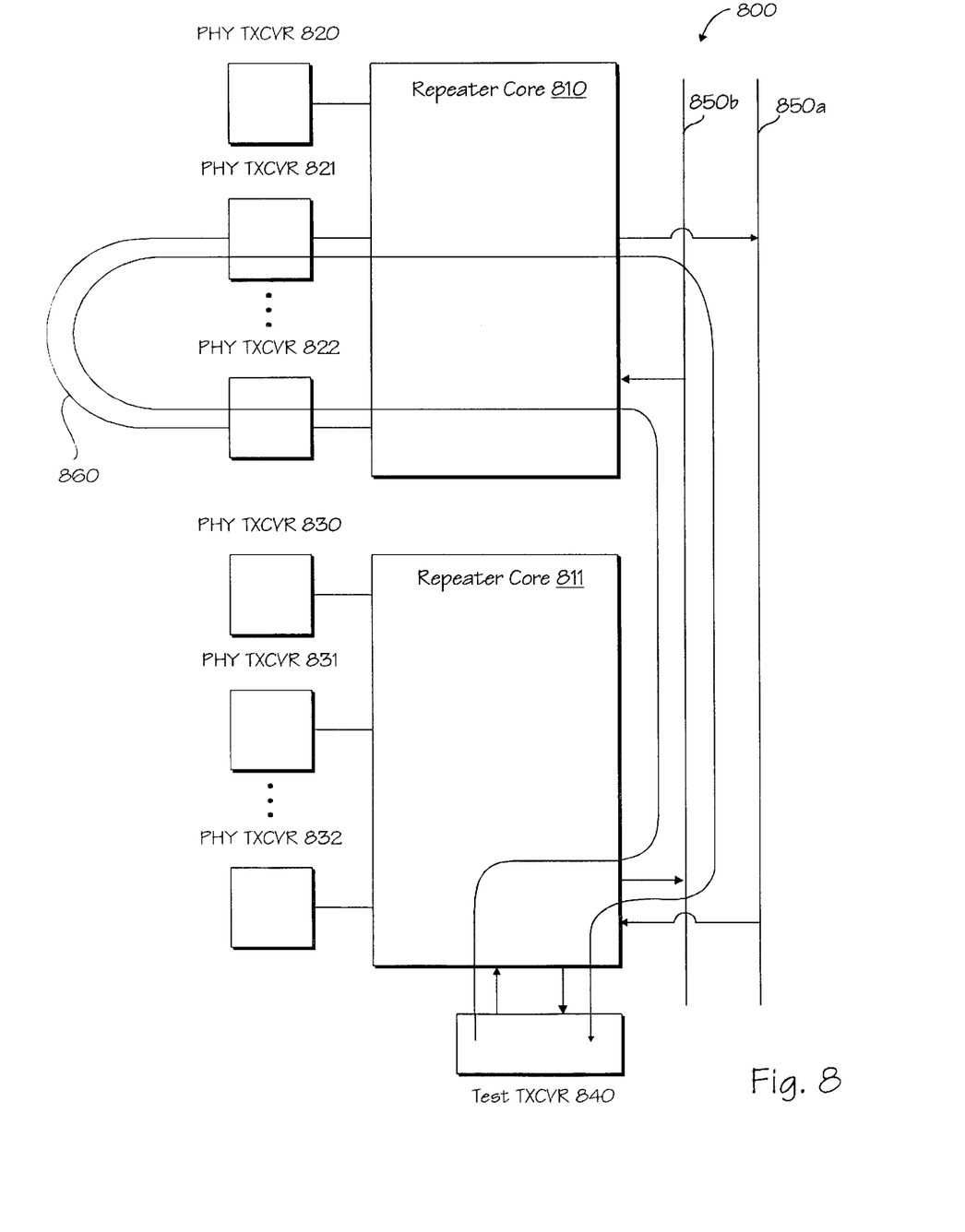
FIG. 8 illustrates one embodiment of the present invention that stacks two Ethernet repeaters.

FIG. 8 illustrates one embodiment of the present invention that cascades or stacks two Ethernet repeaters. Therefore, the stacked Ethernet repeaters may also be tested without an external tester. The testing scheme 800 stacks the repeater core logic 810 on the repeater core logic 811 via an extension port illustrated by lines 850*a* and 850*b*. According to FIG. 8, the repeater core logic 810 is coupled to the physical transceivers 820, 821 and 822, and the repeater core logic 811 is coupled to the physical transceivers 830, 831 and 832. Furthermore, the repeater core logic 811 is coupled to the test transceiver 840.

The following example illustrates how the data paths through the physical transceivers corresponding to a repeater core logic that is stacked on another repeater core logic may be tested. According to FIG. 8, the test transceiver 840 transmits the test packet to the repeater core logic 811. The repeater core logic 811 then transmits the test packet onto the extension bus 850*b*. The extension bus 850*b* then transmits the test packet to the repeater core logic 810. From the repeater core logic 810, the test packet is then transmitted to the transmitting channel of the physical transceiver 822.

The transmitting channel of the physical transceiver 822 is coupled to the receiving channel of the physical transceiver 821 via an external connector. Therefore, the test packet is transmitted from the physical transceiver 822 to the physical transceiver 821. For an alternative embodiment, the physical transceiver receiving the test packet from the repeater core logic 810 may in the loopback mode such that the test packet is internally transmitted from the transmitting channel to the receiving channel of the same physical transceiver.

The receiving channel of the physical transceiver 821 then transmits the test packet back to the repeater core logic 810.

The repeater core logic 810 then transmits the test packet back onto the expansion bus 850a which then transmits the data back to the repeater core logic 811. Typically, the expansion bus (including lines 850a and 850b) is operating in the full-duplex mode during testing. Therefore, the test packets may be transmitted from the repeater core logic 811 to the repeater core logic 810 and from the repeater core 810 to the repeater core 811 simultaneously. The repeater core logic 811 transmits the test packet back to the test transceiver 840.

Figure 9:
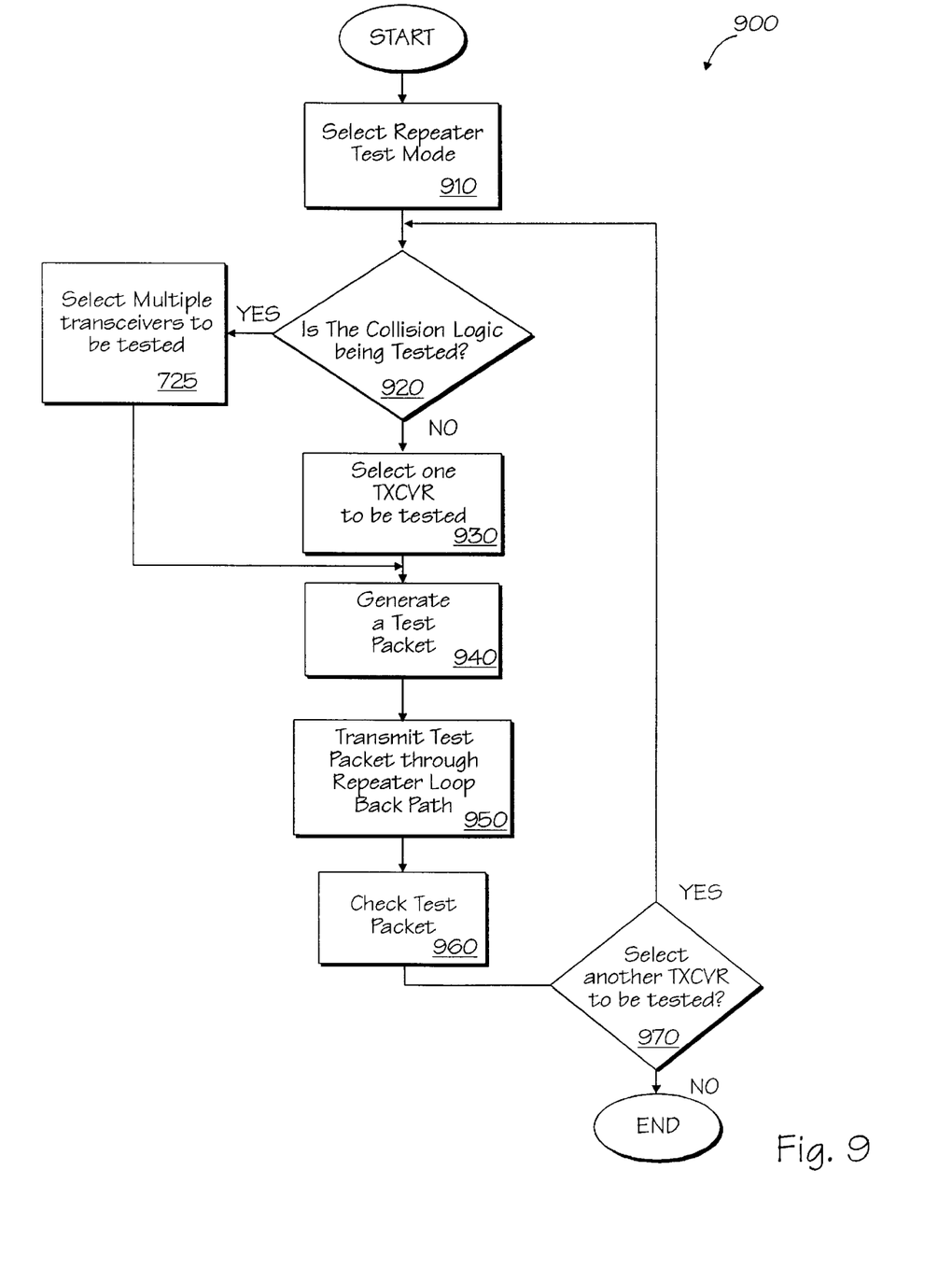
FIG. 9 illustrates a flow chart for testing one or more selected paths within the present Ethernet repeater.

FIG. 9 illustrates a flow chart for testing a selected path through one embodiment of the present Ethernet repeater. When testing a selected path (i.e., through a selected transmitter and a selected receiver) the repeater may be selected to operate in the test mode as shown in step 910. The repeater may be selected to operate in the test mode by either the testing software or by asserting an external pin of the repeater.

Step 920 determines whether the collision logic is being tested. Typically, during the normal mode of operation, two or more transceivers may not receive data packets simultaneously without the repeater detecting a collision error. During testing, the collision logic may or may not be tested. If the collision logic is not tested, then only one transceiver is enabled. On the other hand, if the collision logic is being tested, more than one transceiver is simultaneously enabled as shown in step 925. In both situations, receive activity by the test transceiver simultaneously with receive activity by a physical transceiver does not trigger a collision error.

The transceiver selected for testing is selected in step 930. Data stored in the memory location in the transceiver enable register that corresponds to the selected physical transceiver is used to generate a transmitter enable signal. During step 930, the selected physical transceiver is selected to operate in the loopback mode or the normal mode. When the normal mode is selected, then the transceiver in the selected physical transceiver is externally connected to the receiver in another physical transceiver.

The data generator and checker circuit generates a test packet as shown in step 940. The test packet generated in step 940 is then transmitted through the repeater loopback path as show in step 950. The repeater loopback path transmits the data packet through the test transceiver, the input test path within the repeater core logic, the selected transmitting channel and the receiving channel of at least one of the selected physical transceivers, the output test path within the repeater core logic, and back to the test transceiver.

The data generator and checker circuit then checks the test packet in step 960. If the test packet received by the data generator and checker circuit matches the original test packet generated by the data generator and checker circuit, then the selected data path is functioning properly unless a collision was intentionally generated by enabling multiple transceivers. In this case, the data will be corrupted by the jam pattern. On the other hand, if there is a mismatch between the original test packet generated by the data generator and checker circuit and the test packet received by the data generator and checker circuit, then the selected test path is not functioning properly.

If another transceiver is to be tested then steps 920, 930, 940, 950 and 960 are repeated as shown in step 970. On the other hand, if no other physical transceiver is to be tested, then the testing of the repeater is completed.

Figure 10:
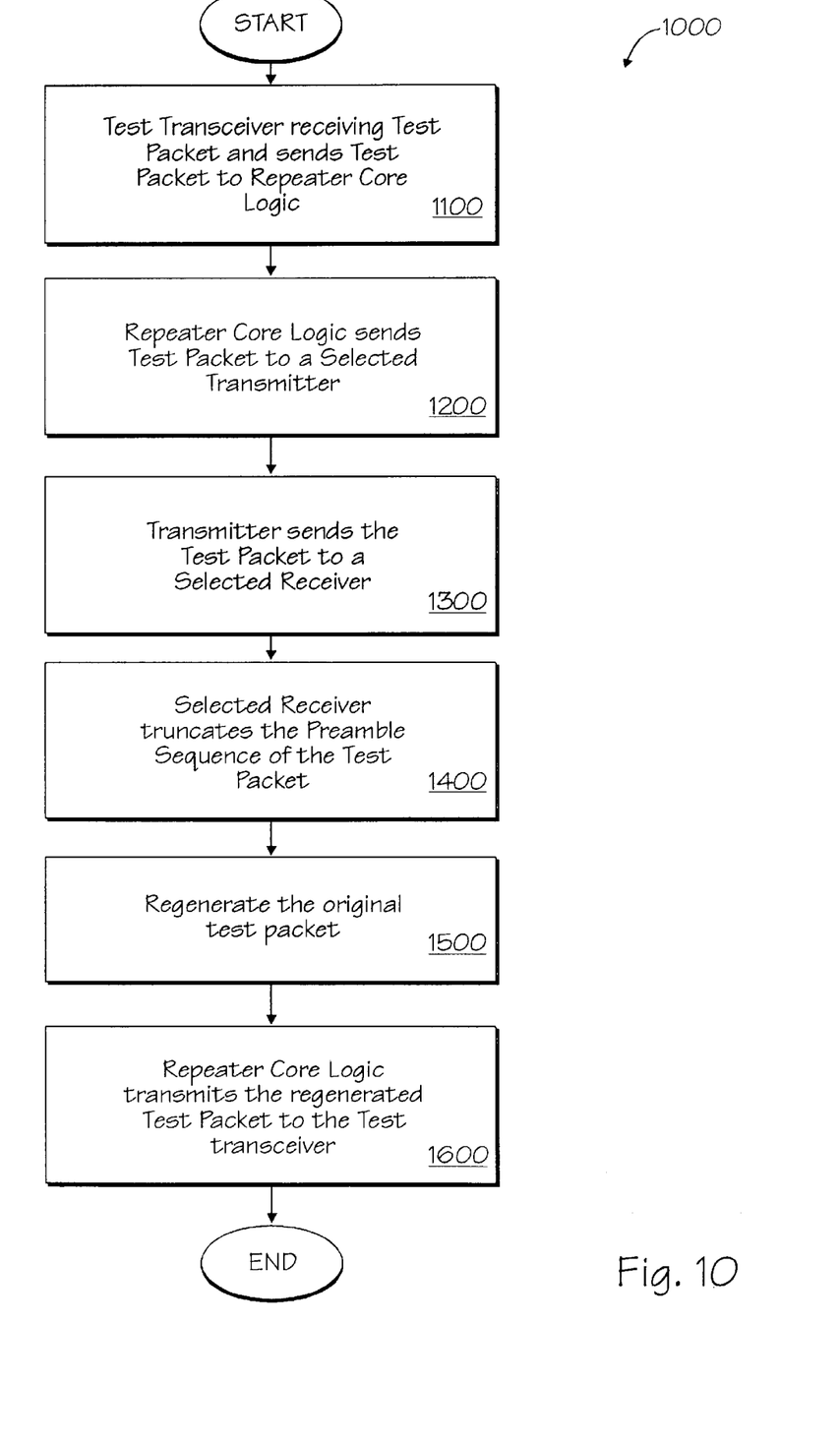
FIG. 10 illustrates a flow chart for transmitting the test packet through the loop-back path within the present Ethernet repeater.

FIG. 10 illustrates a flow chart for transmitting the test packets through the loopback path within the present Ethernet repeater. According to step 1100, the test transceiver receives the test packet from the data generator and checker circuit and sends it to the repeater core logic. The repeater core logic then sends the test packet to a selected transmitter as shown in step 1200. In step 1300, the transmitter sends the test packet to the selected receiver. The selected transmitter and the selected receiver may be located within the same physical transceiver if the selected transceiver is operating in the transceiver loopback mode. Or, the selected transmitter and the selected receiver may be located in different physical transceivers if the selected transceiver is operating in the normal mode of operation.

When the selected receiver first receives data, it indicates to the repeater core logic that there is receive activity on its port. Typically, the preamble sequence of the test packet is truncated as the selected receiver is receiving the test packet as shown in step 1400. Therefore, the repeater core logic starts to regenerate the original preamble sequence which has been truncated by the selected receiver and temporarily buffers the portion of the test packet that has not been truncated. The test packet is regenerated in step 1500 by combining the regenerated preamble sequence with the portion of the test packet that was buffered. The test packet regenerated in step 1500 is then transmitted by the repeater core logic to the test transceiver in step 1600.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawing are, accordingly, to be regarded in an illustrative rather than a restrictive sense.

I claim:

1. An apparatus, comprising:
    a circuit configured to generate and check a test packet;
        a test transceiver coupled to said circuit wherein said test transceiver is configured to operate in a duplex mode to receive said test packet from said circuit and configured to transmit said test packet to said circuit; and
        a core circuit coupled to said test transceiver and to one or more physical transceivers, wherein said core circuit is configured to direct the transmission of said test packet through at least one loopback path that includes at least one of said one or more physical transceivers.

2. The apparatus of claim 1, wherein said at least one loopback path comprises a data path through a receiving channel of said test transceiver, an input test path within said core circuit, a transmitting channel of one of said physical transceiver, a receiving channel of one of said physical transceivers, an output test path within said core circuit, and a transmitting channel of said test transceiver.

3. The apparatus of claim 2, wherein said input test path within said core circuit provides a data path through a first test port, a first multiplexer and a transmit port, and said output test path within said core circuit provides a data path through a receive port, a memory buffer, a second multiplexer and a second test port.

4. The apparatus of claim 1, further comprising a transmit bus and a receive bus, wherein said transmit bus is coupled to a transmit port of said core circuit and a transmitting channel of at least one of said physical transceivers, and wherein said receive bus is coupled to a receive port of said core circuit and a receiving channel of at least one of said physical transceivers.

5. The apparatus of claim 2, wherein said transmitting channel of one of said physical transceivers and said receiving channel of one of said physical transceivers are located within a first physical transceiver, said first physical transceiver is capable of operating in a loopback mode.

6. The apparatus of claim 2, wherein said transmitting channel of one of said physical transceivers is located within a first physical transceiver and said receiving channel of one of said physical transceivers is located within a second physical transceiver, wherein said transmitting channel and said receiving channel are coupled via an external connector.

7. A communication device, comprising:
- a dedicated test transceiver configured to receive test packets from a test packet source and configured to transmit regenerated test packets thereto simultaneously, the dedicated test transceiver also configured to transmit the test packets to a core circuit coupled to said dedicated test transceiver and configured to receive said test packets from said dedicated test transceiver and to transmit said regenerated test packets to said dedicated test transceiver; and
- one or more physical transceivers coupled to said core circuit, wherein at least one of said physical transceivers is configured to receive said test packets from said core circuit and at least one of the one or more physical transceivers is configured to transmit said test packets to said core circuit.

8. The communication device of claim 7, further comprising a circuit coupled to said dedicated test transceiver, wherein said circuit is configured to generate said test packets and configured to test said regenerated test packet.

9. The apparatus of claim 8, wherein said circuit comprises an Ethernet media access controller.

10. The apparatus of claim 7, wherein said dedicated test transceiver is configured to function as one of said physical transceivers during a normal mode of operation.

11. The apparatus of claim 7, wherein one of said physical transceivers is configured to operate in a loopback mode.

12. The apparatus of claim 7, wherein a first and a second selected one of said physical transceivers are configured to operate in a normal mode, wherein a transmitting channel of said first selected one of said physical transceivers is coupled to a receiving channel of said second selected one of said physical transceivers via an external cable.

13. A method comprising transmitting an internally generated test packet through at least one loopback test path that includes at least one transmitting channel and at least one receiving channel of a single transceiver of a communication repeater by:

(1) receiving said test packet from a test transceiver;

(2) inputting said test packet into a first test port of a core circuit and outputting said test packet from a transmit port of said core circuit;

(3) routing said test packet through said at least one transmitting channel;

(4) routing said test packet through said at least one receiving channel;

(5) truncating a preamble sequence of said test packet to produce a truncated test packet;

(6) inputting said truncated test packet into a receiving port of said core circuit, storing said truncated test packet in a memory buffer, generating a new preamble sequence, combining said new preamble sequence and said truncated test packet to form said regenerated test packet and outputting said regenerated test packet from a second test port of said core circuit; and (7) transmitting said regenerated test packet through a transmitting channel of is said test transceiver.

14. The method of claim 13, further comprising decoupling a collision circuit prior to transmitting said test packet through said at least one loopback test path.

15. The method of claim 13, comprising configuring said transceiver to operate in a loopback test mode prior to transmitting said test packet through said at least one loopback test path.

16. The method of claim 13, comprising providing a transmitter enable signal to said transceiver prior to transmitting said test packet through said at least one loopback test path.

17. The method of claim 15, further comprising the steps of:

(1) programming a transceiver enable register;

(2) generating a transmitter enable signal; and (3) providing said transmitter enable signal to a select circuit within said transceiver prior to transmitting said test packet through said at least one loopback test path.

18. The method of claim 13, further comprising configuring said communication repeater to operate in a loopback mode prior to transmitting said test packet through said at least one loopback test path.

* * * * *